United States Patent
Li

(10) Patent No.: US 10,829,170 B2
(45) Date of Patent: Nov. 10, 2020

(54) MULTIFUNCTIONAL ROBOT SYSTEM AND METHOD

(71) Applicant: ZHEJIANG UNIVERSITY, Hangzhou (CN)

(72) Inventor: Xin Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 308 days.

(21) Appl. No.: 15/957,205

(22) Filed: Apr. 19, 2018

(65) Prior Publication Data

US 2018/0304462 A1    Oct. 25, 2018

(30) Foreign Application Priority Data

Apr. 19, 2017   (CN) .......................... 2017 1 0258949
Apr. 17, 2018   (CN) ..................... 2018 2 0539018 U

(51) Int. Cl.
| | |
|---|---|
| B62D 57/024 | (2006.01) |
| B25J 9/16 | (2006.01) |
| B25J 11/00 | (2006.01) |
| B25J 9/00 | (2006.01) |
| B25J 13/00 | (2006.01) |
| E04G 23/00 | (2006.01) |
| A47L 9/28 | (2006.01) |

(52) U.S. Cl.
CPC .......... *B62D 57/024* (2013.01); *A47L 9/2873* (2013.01); *B25J 9/0084* (2013.01); *B25J 9/1664* (2013.01); *B25J 9/1697* (2013.01); *B25J 11/0085* (2013.01); *B25J 13/006* (2013.01); *E04G 23/002* (2013.01); *Y10S 901/01* (2013.01); *Y10S 901/08* (2013.01); *Y10S 901/47* (2013.01)

(58) Field of Classification Search
CPC ..... B62D 57/024; A47L 9/2873; B25J 9/1664
See application file for complete search history.

(56) References Cited

U.S. PATENT DOCUMENTS

| | | | |
|---|---|---|---|
| 9,414,026 B2 * | 8/2016 | Blanchard ........... | G01M 5/0016 |
| 2019/0320859 A1 * | 10/2019 | Bofill ..................... | E04G 23/002 |
| 2020/0011840 A1 * | 1/2020 | Hafenrichter .......... | G01N 29/04 |
| 2020/0030962 A1 * | 1/2020 | Georgeson ............... | B64F 5/30 |

FOREIGN PATENT DOCUMENTS

JP    S60-259386 A  * 12/1985  .............. A47L 11/38

* cited by examiner

*Primary Examiner* — Kevin Hurley
(74) *Attorney, Agent, or Firm* — Platinum Intellectual Property LLP

(57) ABSTRACT

The present invention relates to a multifunctional robot system and method. The multifunctional robot system comprises an independently movable supply station and a plurality of robot units. The supply station comprises a power supply system and a supply station moving device; each robot unit is provided with a robot driving device, an operation execution device and a robot moving device; the supply station is connected with each robot unit respectively through a connecting cable. The multifunctional robot system is provided with the independent supply station, and the execution device of the robot is separated from the driving device thereof and a supply device; the supply station continuously provides raw materials and energy for the robot, the weight and size of the robot side are reduced, and working efficiency is improved.

9 Claims, 12 Drawing Sheets

MULTIFUNCTIONAL ROBOT SYSTEM AND METHOD

CROSS REFERENCE TO RELAYED APPLICATION

This application claims priority to Chinese Patent Application No. 201710258949.5, entitled "MULTIFUNCTIONAL ROBOT SYSTEM AND METHOD" filed on Apr. 19, 2017 and Chinese Patent Application No. 201820539018.2, entitled "MULTIFUNCTIONAL ROBOT SYSTEM AND METHOD" filed on Apr. 17, 2018, the contents of which are expressly incorporated by reference herein in its entirety.

TECHNICAL FIELD

The present invention relates to the technical field of robot applications, and in particular, to a multifunctional robot system having operation capability and an application thereof.

BACKGROUND

With continuous development of the modern scientific and technological level, robots are applied extensively. A Chinese invention patent with the publication number of CN104802872A discloses a wall-climbing robot. The wall-climbing robot E can be adsorbed to the surface of a rough outer wall C to move. Generally, the wall-climbing robot E often obtains continuous power from the outside through a pipe or a wire D. For example, as shown in FIG. 1, when the wall-climbing robot E performs cleaning or spraying operation on the vertical plane, if the distance between the wall-climbing robot E and a roof B is 100 m, the wall-climbing robot E is encountered with the following problems:

(1) If the wall-climbing robot E is provided with a water tank or a coating box and a control component (such as a control valve), the wall-climbing robot E becomes very heavy, and the huge gravity action will cause the wall-climbing robot E to fall.

(2) If a raw material supply device A such as the water tank or the coating box is placed on the roof, raw materials such as water or paint need to be conveyed to the wall-climbing robot E through a very long pipe D, which leads to difficulty in controlling the raw material supply amount. If the raw material control component (a flow valve, a pressure valve, etc.) is placed on the roof, the length (such as 100 m) of the pipe and a cable will lead to severe time lag, and the time lag will lead to the problems of control failure and instability. Moreover, when the raw materials flow through the very long pipe to be conveyed to the wall-climbing robot E, the raw materials are subjected to a great loss along the long pipe, so that pressure and flow at the robot unit end are insufficient. If the raw material control component is installed on the wall-climbing robot E, the weight of the wall-climbing robot E is greatly increased, which is extremely adverse to the wall-climbing robot E.

(3) If the raw material supply device A is placed on the roof, power flow (a current, etc.) needs to be conveyed to the robot unit through a very long cable, which leads to difficulty in power control. If a power control component (a transformer, etc.) is placed on the roof, the length (such as 100 m) of the cable will lead to severe time lag, and the time lag will lead to the problems of control failure and instability. Moreover, when the power flow is conveyed to the robot unit through the very long pipe, the power flow is subjected to a great loss along the long cable, so that power of robot unit end is insufficient. If the power control component is installed on the wall-climbing robot E, the weight of the wall-climbing robot E is greatly increased, which is extremely adverse to the wall-climbing robot E.

(4) With FIG. 2 as an example, when the wall-climbing robot E horizontally moves from a position A to a position B, a cable D is also subjected to corresponding position changes. The weight of the cable D applies a horizontal drag force on the robot unit. That is, the wall-climbing robot E has to drive the cable D to move at the same time when moving. If the cable D is very long, the cable D is very large in mass. For the moving wall-climbing robot E, the cable D becomes a very high inertia load and severely affects movement performance of the wall-climbing robot E. Moreover, in order to resist the immeasurable horizontal drag force, an adsorption device of the wall-climbing robot E has to always operate in a maximum adsorption force state, which leads to too high energy consumption of the adsorption device.

(5) The long cable D which connects the wall-climbing robot E with a roof supply device A is suspended aloft. Fierce crosswind exists aloft, and the crosswind applies an acting force on the cable, which leads to swing of the cable; moreover, the acting force directly acts on the wall-climbing robot E through the cable D to form a horizontal drag force on the wall-climbing robot E, and the horizontal drag force is hereinafter referred to as a crosswind drag force. Moreover, the crosswind drag force varies with the state of the high-altitude crosswind and is an acting force which is instable and difficult to predict. If the cable D is very long (100 m or longer), the acting force becomes very large and severely affects stability of the wall-climbing robot E.

(6) In the operation implementation process, we need to reel or unreel the cable D according to the movement of the wall-climbing robot E. Under ideal conditions, the reeling or unreeling length and speed of the cable D can be calculated according to the relative positions of the wall-climbing robot E and a supply unit A on the roof B. However, the connecting cable D between the wall-climbing robot E and the supply unit A on the roof has a problem of a flexible line body with the two ends fixed, the cable D is further subjected to influences of factors such as gravity and the crosswind acting force, and when the cable D is longer, the influences are more remarkable. Therefore, the problem of the flexible line body becomes very complex and difficult to solve, so that it is difficult to accurately control the reeling or unreeling length and speed of the cable D according to the movement of the robot. If the cable D is reeled or unreeled inappropriately, it certainly has a very serious influence on the movement of the wall-climbing robot E.

It thus can be seen that the aforementioned technical problem needs to be solved for the improvement of the wall-climbing robot.

SUMMARY

The present invention provides a multifunctional robot system having operation capability. The multiple technical problems mentioned in the background art can be solved through the multifunctional robot system.

According to some embodiments, the invention is implemented as following: a robot system is provided and comprises a movable supply station and a plurality of robot units as well as a traction device for driving the supply station to move; the supply station is provided with a power supply system; the supply station is connected with each robot unit respectively through a connecting cable, the connecting cable comprises branch power cables, and the power supply system provides power flow for each robot unit respectively through the branch power cables; each robot unit is provided with a robot driving device, an operation execution device, a robot adsorption device and a robot moving device; the robot driving device makes the robot unit move on a working surface by driving the robot moving device; the plurality of robot units adhere to the working surface through the robot adsorption devices to move; the plurality of robot units move on the horizontal plane or the bevel or the vertical surface or the top surface, and the supply station follows the plurality of robot units to move.

According to some embodiments, the supply station is further provided with a supply station moving device and a supply station adsorption device. The supply station adsorption device adsorbs the supply station to the working surface, and the supply station moving device comes into contact with the working surface, so that the supply station moves on the working surface.

According to some embodiments, the supply station is further provided with at least one approach bridge plate, and at least part of the approach bridge plate is arranged on the supply station in a mode of being accommodated or unfolded; when the approach bridge plate is in an unfolded state, at least one side edge of the approach bridge plate is placed on the working surface and comes into contact with the working surface; the robot units move to the approach bridge plate from the side edge coming into contact with the working surface, and then move to the working surface from the side edge of another or the identical approach bridge plate coming into contact with the working surface.

According to some embodiments, the supply station is further provided with a recycling cabin, the recycling cabin at least accommodates one robot unit, and the robot unit can move into the recycling cabin from the working surface to be recycled and move out of the working surface from the recycling cabin.

According to some embodiments, the approach bridge plate is provided with a recycling cabin, the recycling cabin at least accommodates one robot unit, at least one side edge of the approach bridge plate is placed on the working surface and comes into contact with the working surface, and the robot units can move into the recycling cabin of the approach bridge plate from the working surface to be recycled and move out of the working surface from the recycling cabin of the approach bridge plate.

According to some embodiments, the supply station is further provided with a recycling cabin, the recycling cabin at least accommodates one robot unit, and the robot units can move into the recycling cabin of the supply station through the approach bridge plate from the working surface to be recycled and move out of the working surface from the recycling cabin of the supply station.

According to some embodiments, the side of the recycling cabin is provided with a limiting device, and the limiting device is used for limiting the positions of the robot units.

According to some embodiments, the present invention is implemented as following: an application of the foregoing multifunctional robot system is provided; the plurality of robot units are applied as wall cleaning robots, the operation execution devices are applied as wall cleaning devices, and the walking working surface for the plurality of robot units is a vertical or slanted building wall; the traction device comprises a winch arranged at the top of a building, the winch pulls the supply station through a suspension rope to follow the plurality of robot units to move up and down, the plurality of robot units clean the building wall, and the plurality of robot units adhere to the wall through the adsorption devices thereof to walk; the supply station is provided with a water source, the connecting cable comprises branch power cables and branch water pipes, and the supply station supplies clean water to each robot unit through the branch water pipes.

According to some embodiments, the plurality of robot units each are further provided with a camera shooting device and a robot wireless ranging signal station; images shot by the camera shooting device are transmitted to a remote control system through a wireless transmitting device; the building is provided with wireless positioning devices in communication with the robot wireless ranging signal station, and the wireless positioning devices are also controlled by the remote control system.

Compared with the prior art, according to the multifunctional robot system according to the present invention and the application thereof, the independent supply station is arranged, the execution device of the robot is separated from the driving device thereof and a supply device; the supply station continuously provides raw materials and energy for the robot, the weight and size of the robot side are reduced, single-time working time of the robot is prolonged, working efficiency and stability and controllability of the robot units are improved, and energy consumption can further be reduced.

DESCRIPTION OF EMBODIMENTS

To make the technical problems to be solved, the technical solution and beneficial effects of the present invention clearer and more comprehensible, the following further describes the present invention in detail with reference to the accompanying drawings and embodiments. It should be understood that the specific embodiments described herein are merely used to explain the present invention but are not intended to limit the present invention.

Embodiment 1

Figure 1:
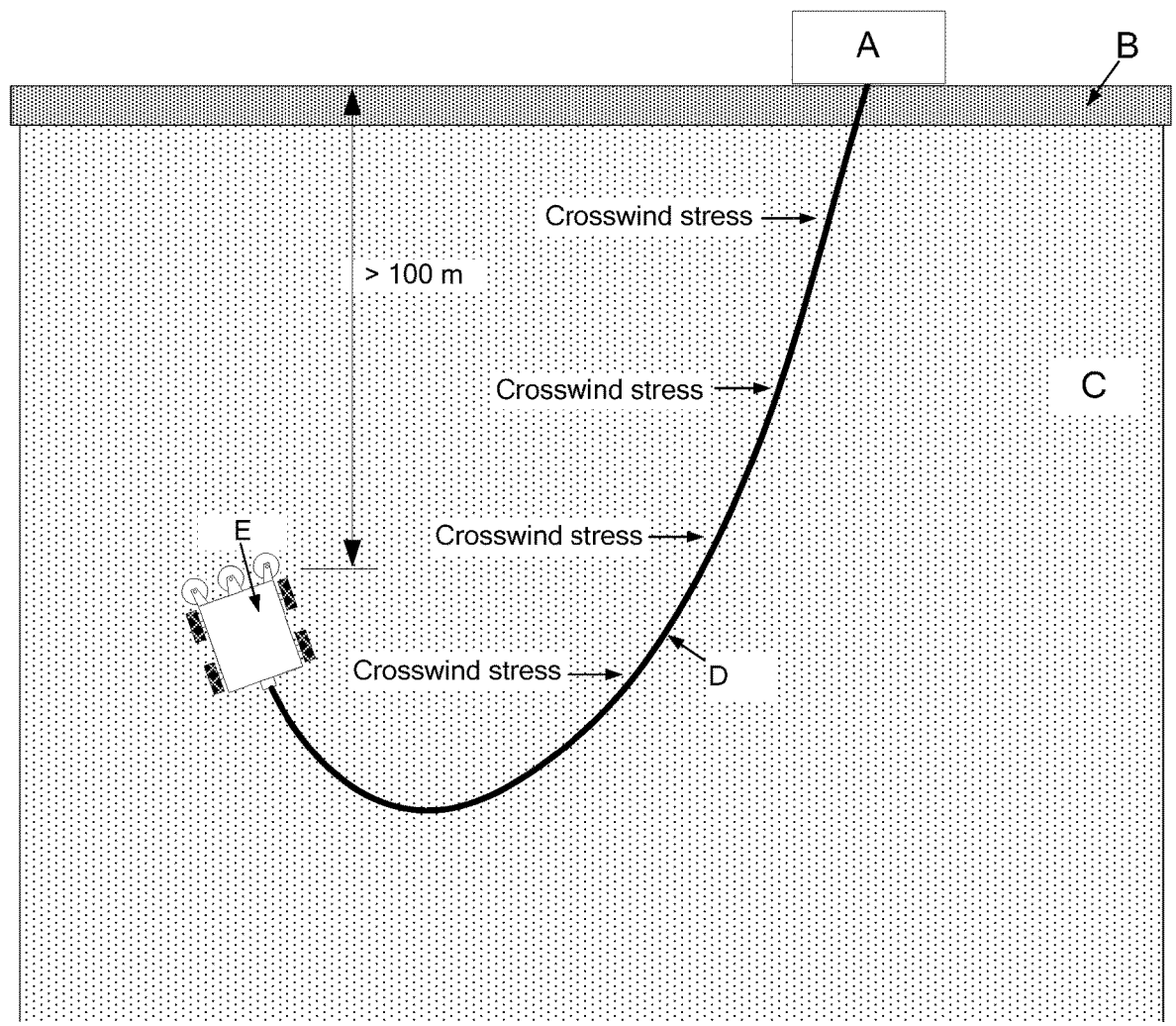
FIG. 1 is an operating schematic diagram of an existing wall-climbing robot.
Figure 2:
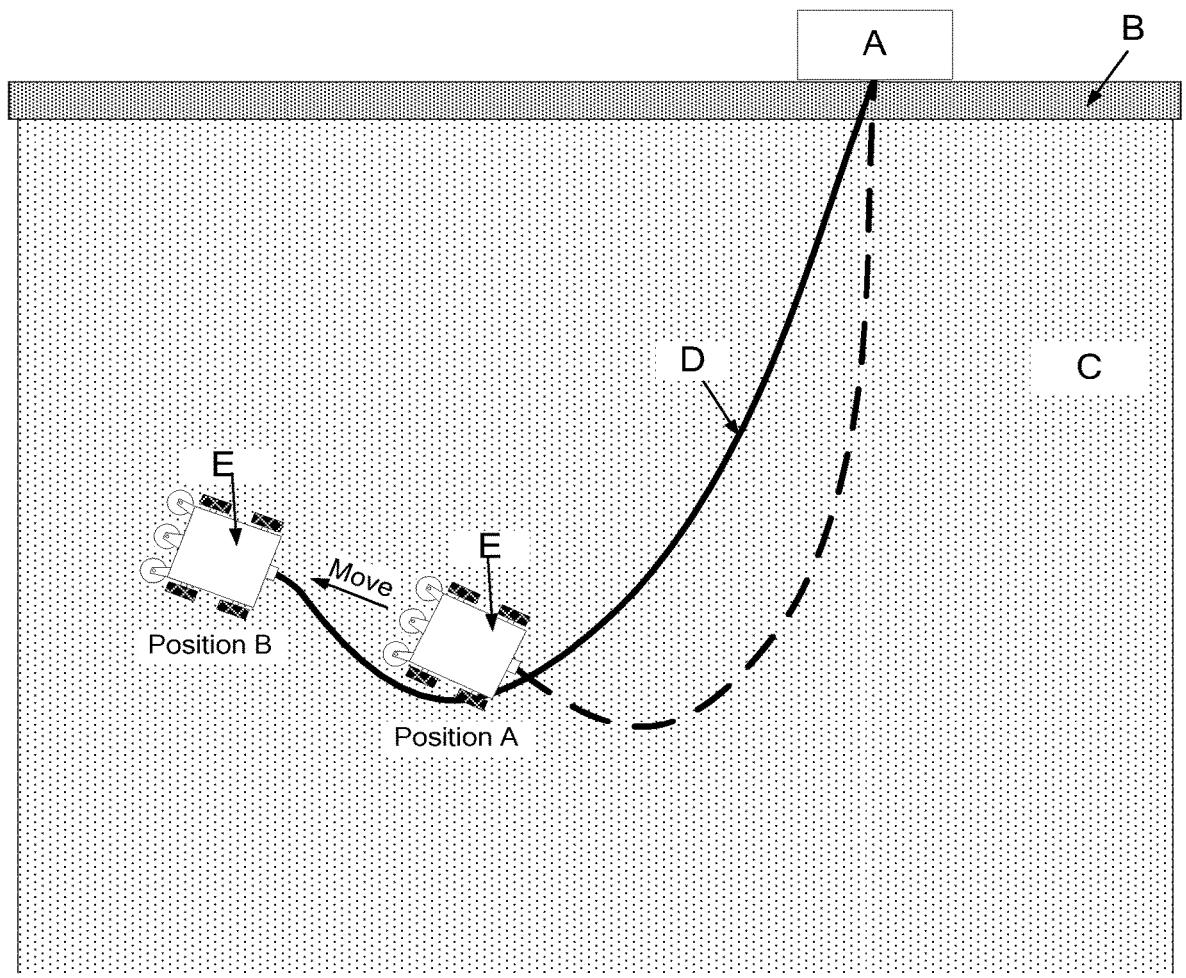
FIG. 2 is a state schematic diagram prior to and after position change of the existing wall-climbing robot on the wall in FIG. 1.
Figure 3:
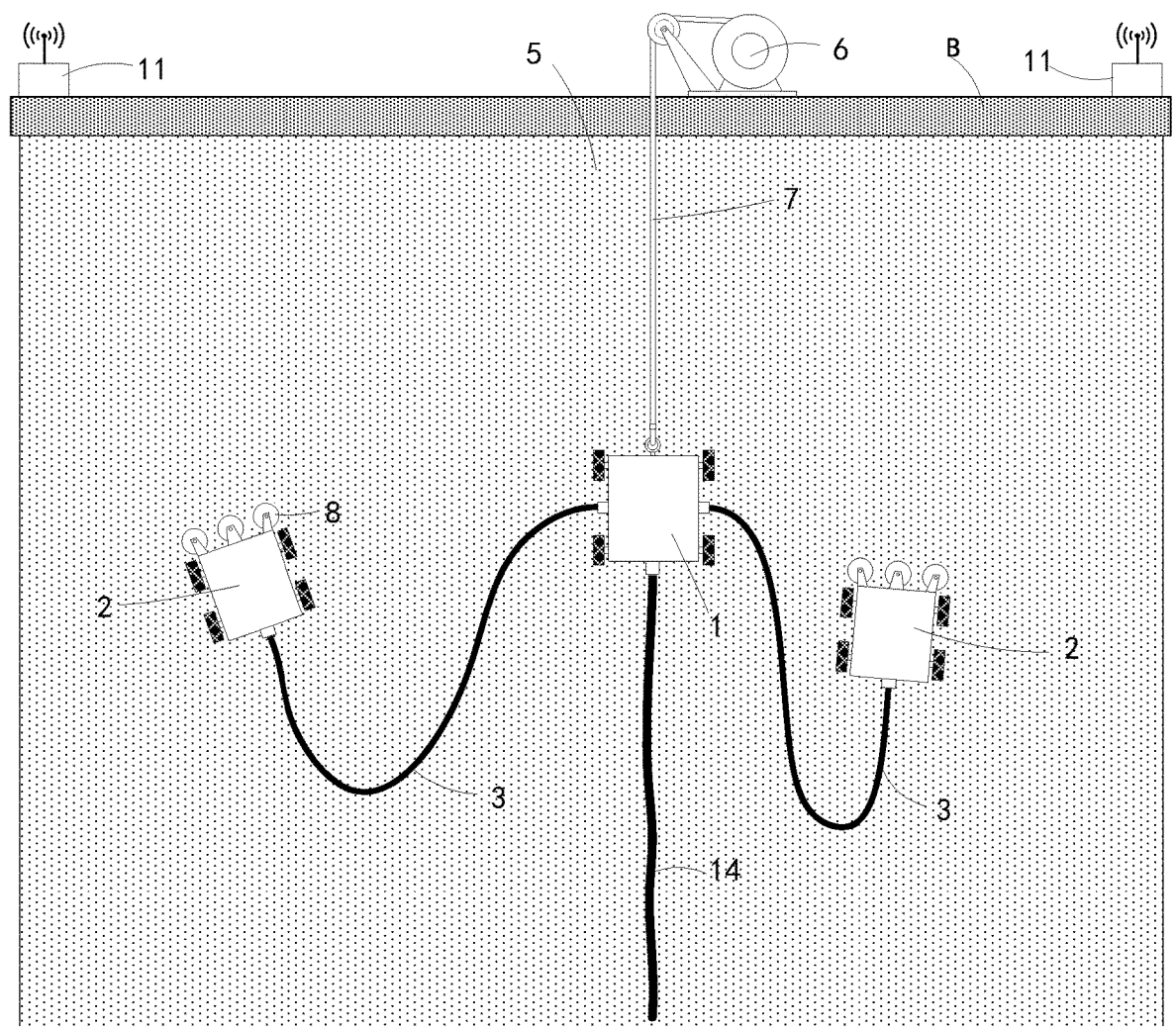
FIG. 3 is a schematic diagram of Embodiment 1, Embodiment 2 and Embodiment 7 of a multifunctional robot system according to the present invention.
Figure 4:
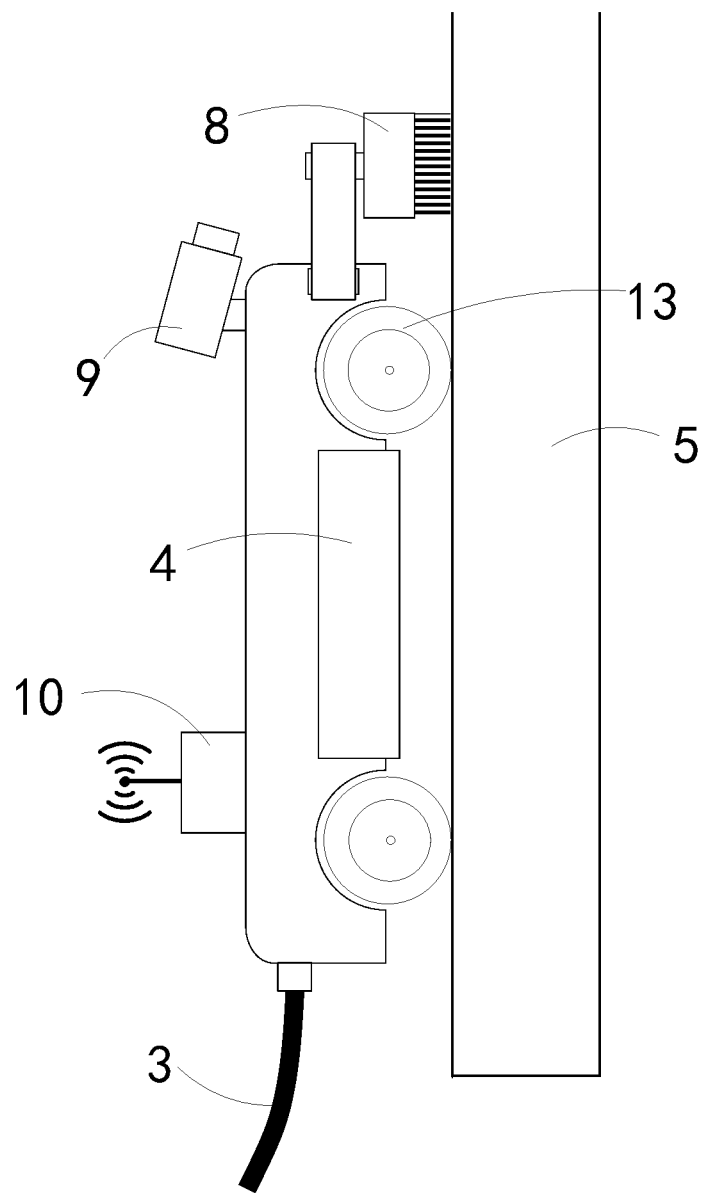
FIG. 4 is a side view of a cleaning robot in FIG. 3.

Referring to FIGS. 3 and 4, a preferred embodiment of a multifunctional robot system according to the present invention comprises a movable supply station 1 and a plurality of robot units 2 as well as a traction device for driving the supply station 1 to move; and the traction device drives the supply station 1 to move. The traction device pulls the supply station 1 through a rope 7. The supply station 1 has no active movement capability and can only be pulled by the traction device to move.

The supply station 1 is provided with a power supply system. The robot units 2 each are provided with a robot driving device, an operation execution device, a robot adsorption device 4 and a robot moving device 13. The supply station 1 is connected with each robot unit 2 respectively through connecting cables 3. The robot driving device makes the robot units 2 to move on a working surface by driving the robot moving device. The power supply system provides power flow for each robot unit 2 respectively through the connecting cables 3. The power flow comprises a power source, a high-pressure air source, a hydraulic source, a high-pressure water source, etc. The robot adsorption device 4 makes the robot units 2 adsorbed to the surface to move.

The plurality of robot units 2 can move and operate on the vertical and slanted surfaces, and can also move and operate on a ceiling, and the supply station 1 follows the plurality of robot units to move. The plurality of robot units 2 walk in a range with the supply station 1 as the center. For example, the operation execution devices of the plurality of robot units 2 may be cameras to implement camera shooting operation. Again for example, the operation execution devices of the plurality of robot units 2 may be sonic analyzers to implement flaw detection operation of the working surface.

The supply station 1 is provided with the power supply system. The power supply system obtains continuous power flow from below or above through a conveying cable 14. In the example of FIG. 3, the power supply system obtains continuous power flow from below through the conveying cable 14. The power supply system may also be provided with a power source, such as a storage battery, and the power flow is conveyed from the power source to the robot units 2 through a connecting cable 3.

With the sonic analyzers as an example, the operation execution devices are ultrasonic probes. Ultrasonic signal amplification and storage processing components are usually heavy, and we can place these heavy components on the supply station 1. In this way, the weight of the robot units 2 can be reduced, and thus the problem (1) in the background art is solved.

With wall cleaning as an example, the operation execution devices are hairbrush devices, and a device for providing cleaning water for wall cleaning is referred to as a raw material supply device (in this example, the raw material specially refers to cleaning water). The raw material supply device usually comprises a booster pump and a control valve and the like, and thus the raw material supply device has a very large weight. The operation execution devices can be installed on the robot units 2, and the raw material supply device is installed on the supply station 1. The conveying cable 14 comprises raw material branch pipes, and clean water is conveyed to the raw material supply device on the supply station 1. The connecting cables 3 include raw material branch pipes, and the cleaning water passes through the branch pipes to be conveyed to the operation execution devices of the robot units 2. The connecting cables 3 each are usually only more than ten meters long. Raw material flow does not lead to obvious time tag and loss along the cable when being conveyed in the connecting cable which is more than ten meters long, and thus it can be guaranteed that the raw material flow is sufficiently supplied and effectively controlled. The problem (2) in the background art is solved.

In this embodiment, the power supply system of the supply station 1 provides power flow for the robot units 2 through the connecting cables 3. The connecting cables 3 each are usually only more than ten meters long. The power flow does not lead to obvious time tag and loss along the cable when being conveyed in the connecting cables which each are more than ten meters long, and thus it can be guaranteed that the power flow is sufficiently supplied and effectively controlled. The problem (3) in the background art is solved.

In this embodiment, when the robot units 2 move, only the connecting cables 3 which each are more than ten meters long needs to be driven. For the robot units 2, this is a small inertia load, the mobility performance of the robot units 2 is not affected, and the problem (4) in the background art is solved.

Embodiment 2

Referring to FIGS. 3 and 4, in a varied embodiment of Embodiment 1, the supply station 1 is further provided with a supply station adsorption device and a supply station moving device (not illustrated in FIG. 3). For working aloft, a rope 7 for suspending the supply station 1 can be as long as dozens of meters or even hundreds of meters. Fierce crosswind exists aloft, the crosswind applies an acting force on the rope 7 to make the rope 7 swing, so that the supply station 1 swings. The swinging supply station 1 pulls the robot units 2 through the connecting cables 3, so that the stability of the robot units 2 is affected severely. The supply station moving device comprises a plurality of wheels. The supply station adsorption device makes the supply station 1 adhere to the working surface, so that the wheels of the supply station moving device and the working surface come into contact and produce friction force. The friction force can overcome a crosswind drag force of the rope 7. As a result, the crosswind drag force is not transmitted to the connecting cable 3 and is not transmitted to the robot units 2, so that the influence of the immeasurable crosswind drag force is eliminated, and the stability of the robot units 2 is ensured. The influence of the immeasurable crosswind drag force is eliminated, and the adsorption devices 4 of the robot units 2 do not need to always operate in a maximum adsorption force state. Therefore, the energy consumption of the adsorption devices 4 becomes small. The problem (5) in the background art is solved well.

In this embodiment, the supply station adsorption device makes the supply station 1 adhere to the working surface, and randomly varying external forces such as the crosswind drag force are overcome by the friction force between the supply station 1 and the working surface. Therefore, the problem of the flexible line body which has two fixed ends and is composed of the robot units 2, the supply station 1 and the connecting cables 3 becomes simple, and the robot units 2 can move freely in the length range of the connecting cables 3. The problem (6) in the background art is solved well.

Embodiment 3

Figure 5:
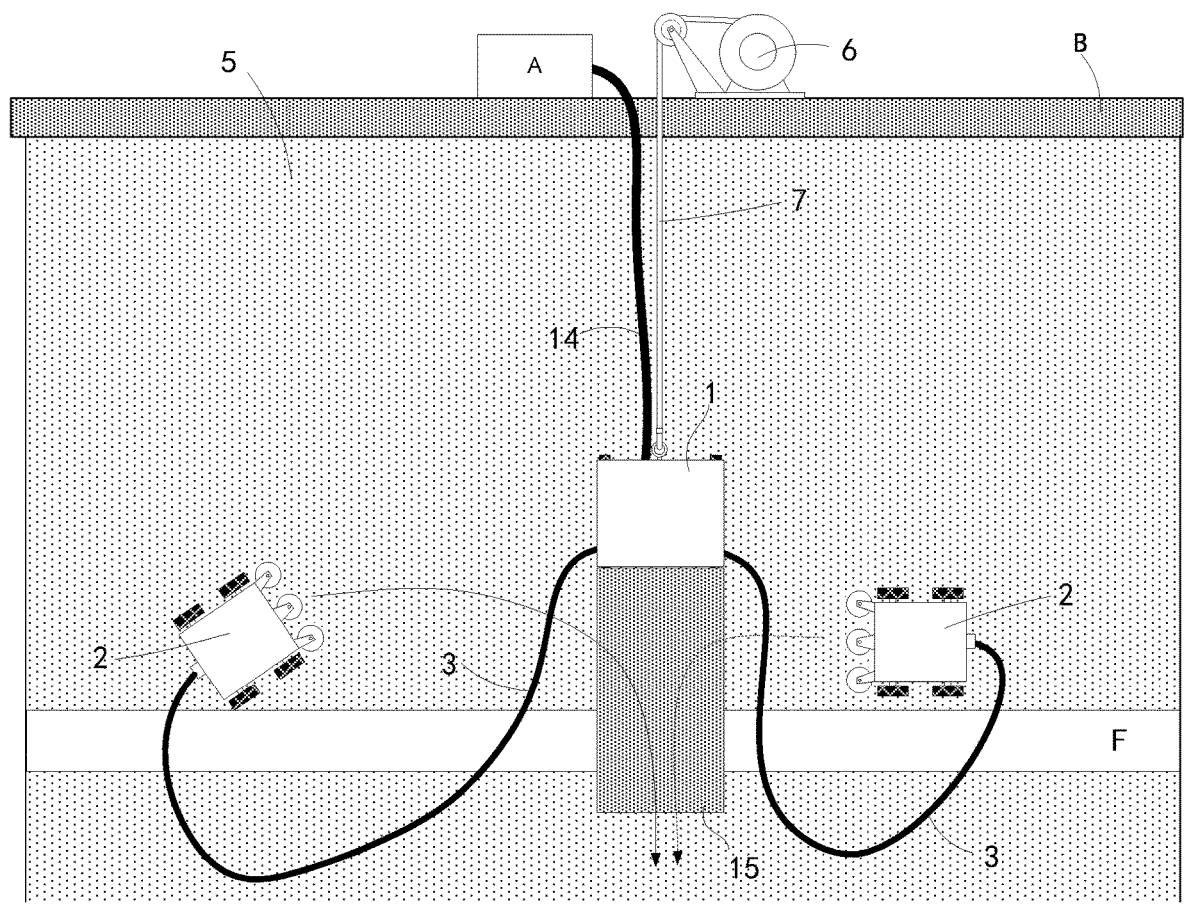
FIG. 5 is a schematic diagram of a usage state of Embodiment 3 of the multifunctional robot system according to the present invention.

FIG. 5 is a varied embodiment of Embodiment 2. The supply station 1 is further provided with a supply station moving device and a supply station adsorption device (not illustrated in the figure). The supply station moving device comprises a plurality of wheels. The supply station 1 is further provided with an approach bridge plate 15, and at least part of the approach bridge plate 15 is arranged on the supply station 1 in a mode of being accommodated or unfolded; when the approach bridge plate 15 is in an unfolded state, at least one side edge of the approach bridge plate 15 is placed on the working surface, and the robot units 2 move to the approach bridge plate 15 from the side edge and move out of the approach bridge plate 15 from another side edge. The supply station 1 in FIG. 5 is provided with an approach bridge plate 15. One side edge of the approach bridge plate 15 is installed on the supply station 1 and rotates with the side edge as the axis, and thus the approach bridge plate 15 can be accommodated or unfolded. When the approach bridge plate 15 is in the unfolded state, a plurality of side edges of the approach bridge plate 15 come into contact with a wall 5. The robot units 2 move to the approach bridge plate 15 from one side edge of the approach bridge plate 15 and move out of the approach bridge plate 15 from the other side edge, as shown in a mobile path illustrated by dotted lines in FIG. 5. After the robot units 2 cross a trench F, the approach bridge plate 15 rotates through a certain angle to be in an accommodated state, the side edge of the approach bridge plate 15 departs from the wall 5, and the friction between the side edge of the approach bridge plate 15 and the wall 5 is avoided during movement of the supply station 1.

This embodiment is applied to occasions where the working surface is provided with a deep and wide trench F or an offset, e.g., recessed modification trenches in many tall buildings. Because when the working surface has the trench or the offset and the working surface is discontinuous, the robot units 2 in Embodiment 1 and Embodiment 2 cannot cross the trench F or the offset, so that operation cannot be performed. In this embodiment, through the bridging effect of the approach bridge plate 15, the robot units 2 can move to the working surface on the other side of the trench F or the offset, and continuous operation of the robot units 2 is performed.

Embodiment 4

Figure 6:
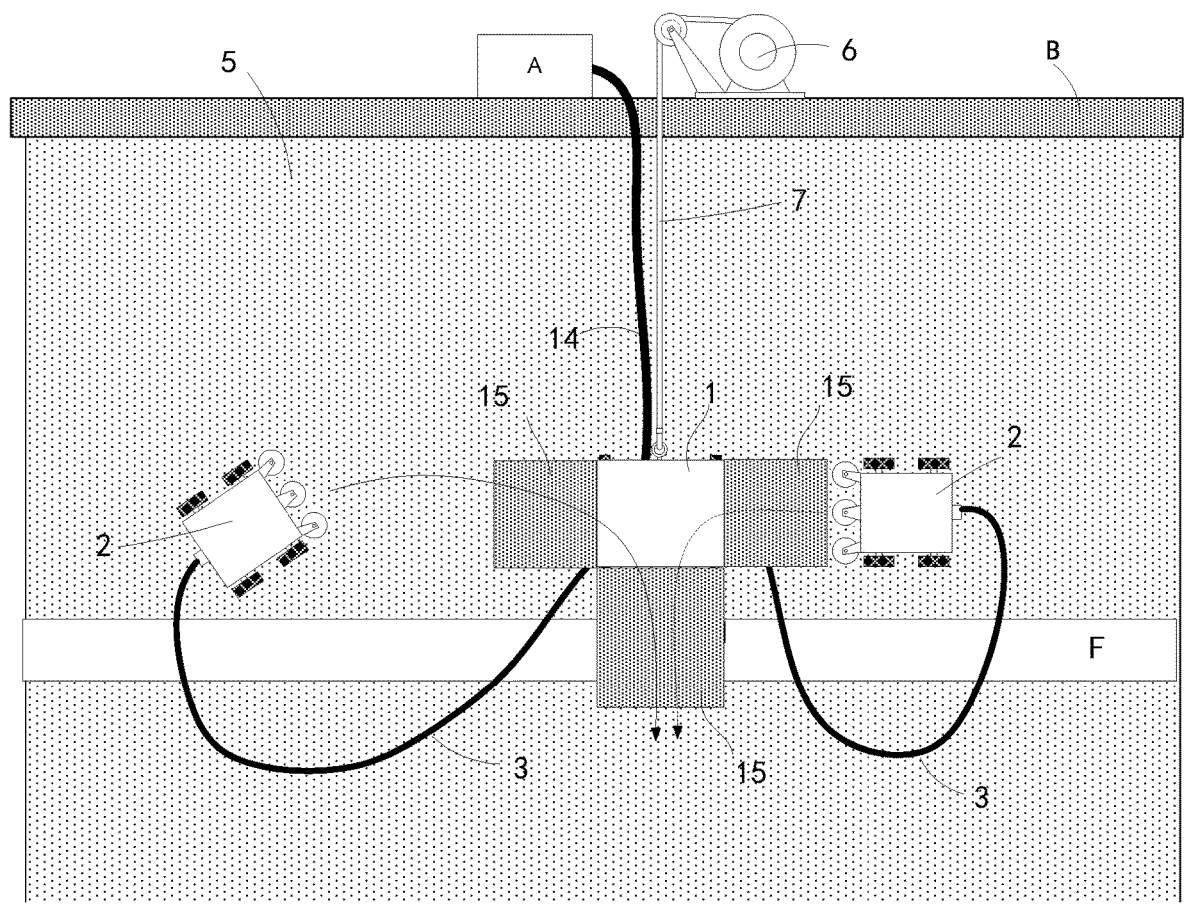
FIG. 6 is a schematic diagram of a usage state of Embodiment 4 of the multifunctional robot system according to the present invention.

Referring to FIG. 6, in a varied embodiment of Embodiment 3, the supply station 1 in FIG. 6 is provided with three approach bridge plates 15 in total. One side edge of each approach bridge plate 15 is installed on the supply station 1 and rotates with the side edge as the axis, and thus the approach bridge plates 15 can be accommodated or folded. When the approach bridge plates 15 are in an unfolded state, the other side edge of each approach bridge plate 15 comes into contact with the wall 5. The robot units 2 move to one approach bridge plate 15 and move out of another approach bridge plate 15, as shown in a mobile path illustrated by dotted lines in FIG. 6. After the robot units 2 cross a trench F, the approach bridge plates 15 rotate through a certain angle to be in an accommodated state, the side edges of the approach bridge plates 15 depart from the wall 5, and the friction between the side edges of the approach bridge plates 15 and the wall 5 is avoided during movement of the supply station 1.

In this embodiment, through the bridging effect of the approach bridge plates 15, the robot units 2 move to the working surface on the other side of the trench F or the offset, and continuous operation of the robot units 2 is performed.

Embodiment 5

Figure 7:
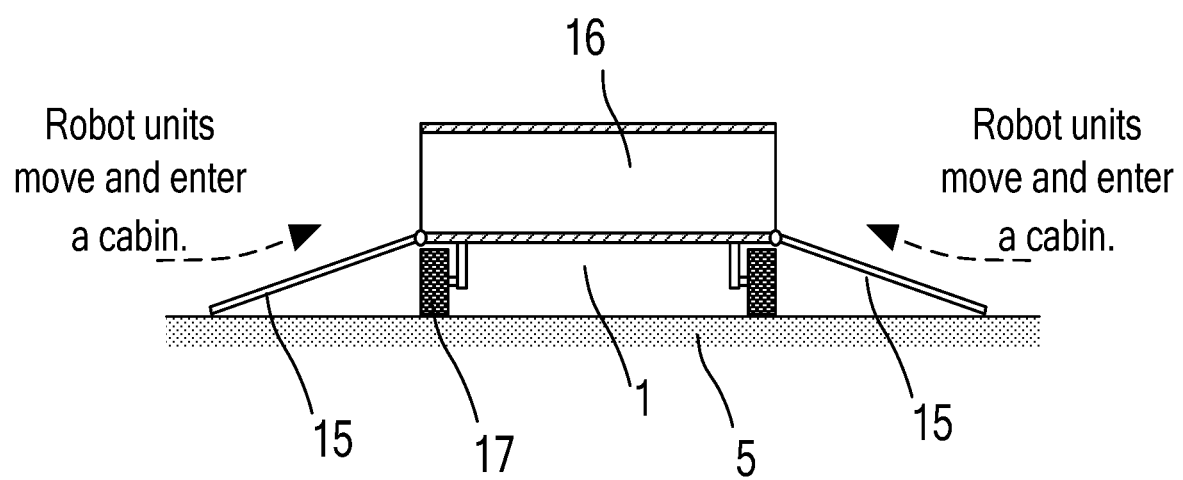
FIG. 7 is a cross-sectional schematic diagram of a supply station usage state of Embodiment 5 of the multifunctional robot system according to the present invention.

Referring to FIG. 7, it illustrates another varied embodiment of Embodiment 2. FIG. 7 is a cross-section diagram of the supply station 1. The supply station 1 is further provided with a supply station moving device and a supply station adsorption device. The supply station moving device comprises a plurality of wheels 17. The supply station 1 is further provided with a recycling cabin 16, the recycling cabin 16 at least accommodates one robot unit 2, and the robot unit 2 can move into the recycling cabin 16 from the working surface 5 to be recycled or move out of the working surface 5 from the recycling cabin 16. The approach bridge plate 15 is arranged on the outer side of the recycling cabin 16, and can be accommodated or unfolded. When the approach bridge plate 15 is in an unfolded state, at least one side edge of the approach bridge plate 15 is placed on the working surface 5 and comes into contact with the working surface 5. The robot units 2 move into the recycling cabin 16 through the approach bridge plate 15. If the recycling cabin 16 is arranged to be very close to the working surface, the approach bridge plate 15 may not be needed, and the robot units 2 can directly enter the recycling cabin 16.

Figure 9:
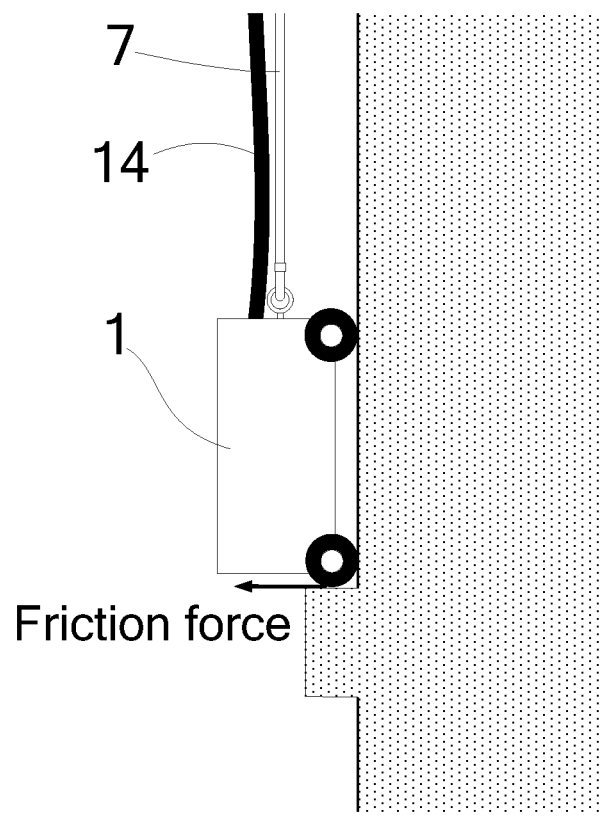
FIG. 9 is a schematic diagram illustrating that a driving wheel of the supply station crosses the protrusion obstacle in FIG. 7.

This embodiment not only is suitable for occasions where the working surface is provided with the deep and wide trench F, but also is suitable for occasions where the working surface has a protrusion G. The concrete obstacle crossing working principle in this embodiment is as follows:

When the approach bridge plate 15 of the recycling cabin 16 is in an unfolded state, one side edge of the approach bridge plate 15 comes into contact with the working surface. The robot units 2 move to the recycling cabin 16 of the supply station 1 through the approach bridge plate 15, and then the approach bridge plate 15 is folded to be in an accommodated state. The supply station 1 with the robot units 2 crosses obstacles such as the trench F or the protrusion G by means of the traction device and the supply station moving device. When the height of the obstacle which is the protrusion G is smaller than the radius of each wheel 17 of the supply station moving device, the wheels 17 may be non-driving driven wheels. When the height of the obstacle which is the protrusion G is larger than the radius of each wheel 17 of the supply station moving device, the wheels 17 must be driving wheels. Friction force can be generated between the driving wheels and the protrusion G to help the supply station 1 to cross the obstacle which is the protrusion G, as shown in FIG. 9. After the supply station 1 crosses the obstacle which is the protrusion G, the approach bridge plate 15 is unfolded again, and the robot units 2 move to the working surface to continue to perform operation.

Figure 8:
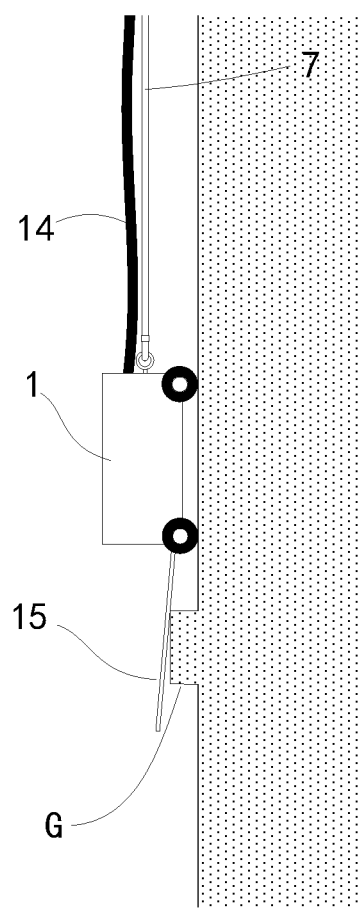
FIG. 8 is a schematic diagram illustrating that the supply station crosses a protrusion obstacle through an approach bridge plate in FIG. 7.

The bridging solutions in Embodiments 3 and 4 can only help the robot units 2 to cross the obstacle which is the recessed trench F, but are invalid for the following two conditions. (1) When the trench F is very wide (e.g., when the trench F is 5 m wide), the approach bridge plate 15 which is at least 5 m long is required for the bridging solutions; apparently, the approach bridge plate 15 which is 5 m long is too large for the supply station 1, and the size and weight of the supply station are greatly increased; (2) when the robot system needs to cross the obstacle which is the very tall protrusion G, as shown in FIG. 8, the approach bridge plate 15 in the bridging solutions is jacked up by the obstacle which is the very tall protrusion G, so that the side edge of the approach bridge plate 15 cannot come into contact with the working surface; and as a result, the robot units 2 cannot move in or out of the approach bridge plate 15. The two above-mentioned problems can be solved well according to the solution in this embodiment.

Figure 10:
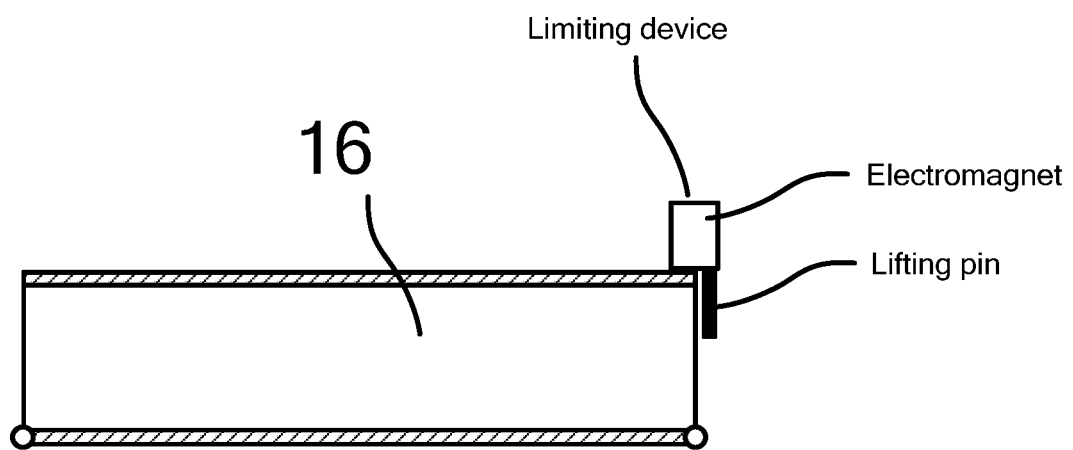
FIG. 10 is a cross-sectional schematic diagram of a recycling cabin in FIG. 7.

Moreover, the recycling cabin 16 may further be provided with a controllable limiting device (not illustrated in the figure). After the robot units 2 enter the recycling cabin 16, the limiting device is started, so that the robot units 2 are limited in the recycling cabin. Thus, in the process of moving the supply station 1, the robot units 2 cannot fall out of the recycling cabin 16, and the safety of the robot units 2 is ensured. For example, in the limiting device, a lifting pin may be driven by an electromagnet and the lifting pin extends out to perform limiting, as shown in FIG. 10.

Embodiment 6

Figure 11:
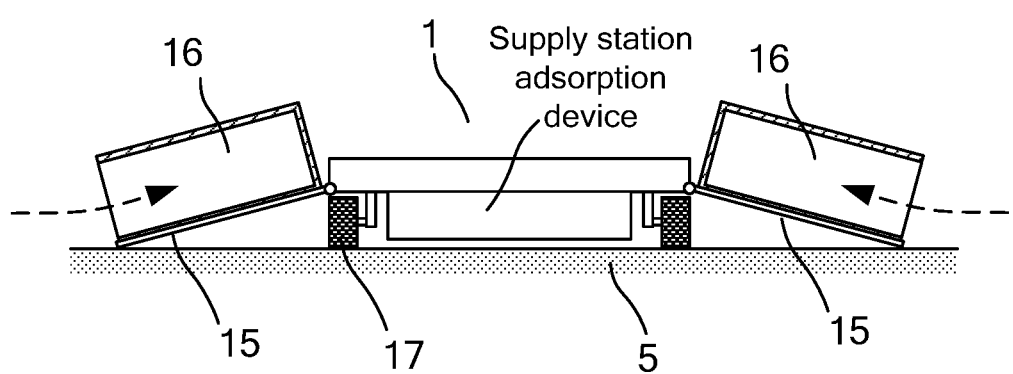
FIG. 11 is a schematic diagram of Embodiment 6 of the multifunctional robot system, according to some embodiments.

The embodiment as shown in FIG. 11 is a varied embodiment of Embodiment 5. FIG. 11 is a cross-sectional top view of the supply station 1. The recycling cabin 16 is arranged on the approach bridge plate 15. When the robot units 2 are recycled, the approach bridge plate 15 and the recycling cabin 16 are unfolded together, and one end of the approach bridge plate 15 comes into contact with the working surface.

Embodiment 7

Referring to FIGS. 3 and 4 together, as a special application of the present invention, the foregoing robot system is applied to the field of building wall cleaning. The plurality of robot units 2 are applied as wall cleaning robots, the operation execution devices are applied as wall cleaning devices, the walking working surface for the plurality of robot units 2 is a vertical or slanted building wall 5; and the traction device comprises a winch 6. In this embodiment, the walking surface for the supply station 1 and the plurality of robot units 2 is the building wall 5. The winch 6 is arranged at the top B of the building, and the winch 6 pulls the supply station 1 through the suspension rope 7 to move up and down along the wall. The plurality of robot units 2 as the wall cleaning robots clean the building wall, and the wall cleaning robot is provided with a cleaning device 8. The plurality of robot units 2 adhere to the wall 5 through the adsorption devices 4 thereof to walk. The supply station 1 is provided with a water source supply (not illustrated in the figure). The water source supply may be a water tank and a pressurized water pump which are arranged on the supply station 1, and the pressurized water pump pressurizes and conveys water in the water tank to the robot units 2. The water source supply can also be implemented by obtaining a continuous pressurized water source from the outside (such as a roof) through a raw material conveying pipe, and the water source is conveyed to the robot units 2 through a raw material transfer pipe on the supply station 1. The connecting cable 3 comprises branch power cables and branch water pipes. The supply station 1 supplies clean water to each robot unit 2 through the branch water pipes.

The plurality of robot units 2 each are further provided with a camera shooting device 9 and a robot wireless ranging signal station 10. Images shot by the camera shooting device 9 are transmitted to a remote control system through a wireless transmitting device, and the images are used for assisting operators in monitoring and control. The building is provided with a plurality of wireless positioning devices 11 in communication with the robot wireless ranging signal station 10, and the wireless positioning devices 11 are used for obtaining the positions of the robot units.

Embodiment 8

Figure 12:
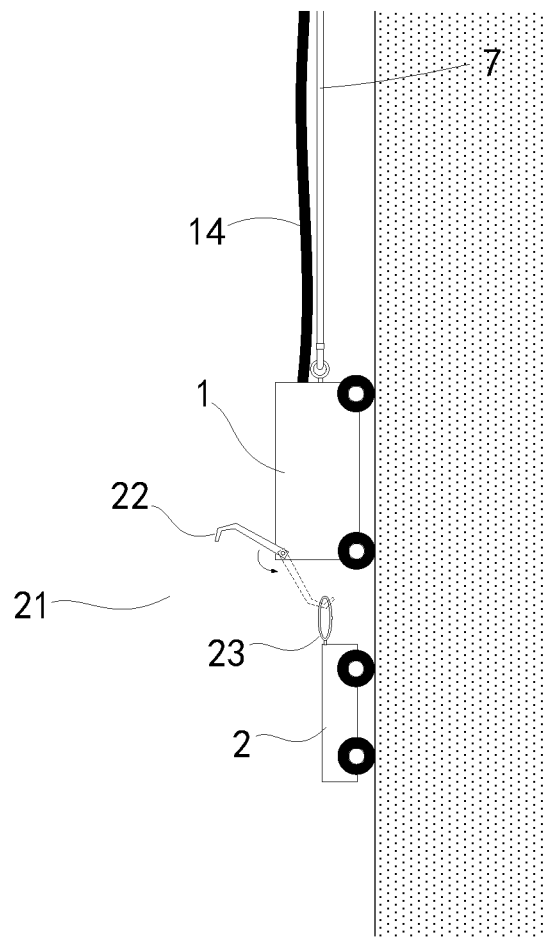
FIG. 12 is a schematic diagram of Embodiment 8 of the multifunctional robot system, according to some embodiments.

In embodiment 5 and 6, robot unit 2 is accommodated in supply station 1, such that robot unit 2 and supply station 1 become one unit. However, adding approach bridge plates and/or recycling cabins on supply station 1 make supply station 1 complex and heave. FIG. 12 illustrates another varied embodiment. Supply station 1 and robot unit 2 can be connected via a coupling device 21 that provides a detachable coupling between the robot units 2 and supply station 1. Coupling devices 21 provides an alternative mechanism to connect supply station 1 and robot unit 2, which enables the units to be connected and disconnected as necessary. According to some embodiments, coupling device 21 can include a rotatable hook connector 22 fixed on supply station 1 and a ring connector 23 fixed on robot unit 2. When robot unit 2 approaches supply station 1, hook connector 22 rotate and catch ring connector 23 so that supply station 1 and robot unit 2 are connected as one unit.

Such a design can be advantageous. For example, when supply station 1 and robot unit 2 are connected as one unit, supply station 1 can bring robot unit 2 to cross over a large trench. For another example, when some failure or error occur to robot unit 2, supply station 1 can engage robot unit 2 via coupling device 21 to keep robot unit 2 safe.

Alternatively, coupling device 21 can include a hook connector fixed on robot unit 2 and a ring connector fixed on supply station 1. Furthermore, coupling devices 21 can use other connection mechanism such as magnetic connectors.

The foregoing descriptions are merely preferred embodiments of the present invention, but are not intended to limit the present invention. Any modification, equivalent replacement, or improvement made without departing from the spirit and principle of the present invention shall fall within the protection scope of the present invention.

What is claimed is:

1. A multifunctional robot system, comprising:
    a movable supply station comprising a power supply system;
    a plurality of robot units;
    a traction device for driving the movable supply station; and
    a plurality of coupling devices configured to flexibly connect the plurality of robot units to the movable supply station,
    wherein the movable supply station is connected with each of the plurality of robot units through a connecting cable, the connecting cable comprises a plurality of branch power cables, and the power supply system is configured to provide power for each robot unit respectively through the plurality of branch power cables;
    wherein each of the plurality of robot units is provided with a robot driving device, an operation execution device, a robot adsorption device and a robot moving device; and
    wherein the robot driving device is configured to enable the each of the plurality of robot units to move on a working surface, the robot adsorption device is configured to adhere the each of the plurality of robot units to the working surface, the plurality of robot units are configured to move on a horizontal or vertical plane or over a bevel, and the movable supply station is configured to follow the plurality of robot units.

2. The multifunctional robot system of claim 1, wherein each of the plurality of coupling devices comprises a rotatable hook connector fixed on the movable supply station and a ring connector fixed on each of the plurality of robot units.

3. The multifunctional robot system of claim 1, wherein each of the plurality of coupling devices comprises a rotatable hook connector fixed on each of the plurality of robot units and a ring connector fixed on the movable supply station.

4. The multifunctional robot system of claim 1, wherein the movable supply station further comprises:
a movable supply station moving device and a movable supply station adsorption device, wherein the movable supply station adsorption device is configured to adhere the movable supply station to the working surface, and the movable supply station moving device is configured to remain contact with the working surface so that the movable supply station moves on the working surface.

5. The multifunctional robot system of claim 4, wherein the movable supply station further comprises:
at least one approach bridge plate that is configured to be accommodated or unfolded.

6. The multifunctional robot system of claim 4, wherein the movable supply station further comprises:
a recycling cabin that is configured to accommodate at least one robot unit, wherein the robot unit is configured to move into the recycling cabin from the working surface or move out from the recycling cabin to land on the working surface.

7. The multifunctional robot system of claim 5, wherein the approach bridge plate further comprises:
a recycling cabin that is configured to accommodates at least one robot unit, wherein the robot unit is configured to move into the recycling cabin from the working surface or move out from the recycling cabin to land on the working surface.

8. The multifunctional robot system of claim 5, wherein the movable supply station further comprises:
a recycling cabin that is configured to accommodates at least one robot unit, wherein the robot unit is configured to move into the recycling cabin through the approach bridge plate from the working surface or move from the recycling cabin to land on the working surface.

9. The multifunctional robot system of claim 5, wherein each side of the recycling cabin comprises a limiting device that is configured to limit the positions of one robot unit.

* * * * *